Figure 1:
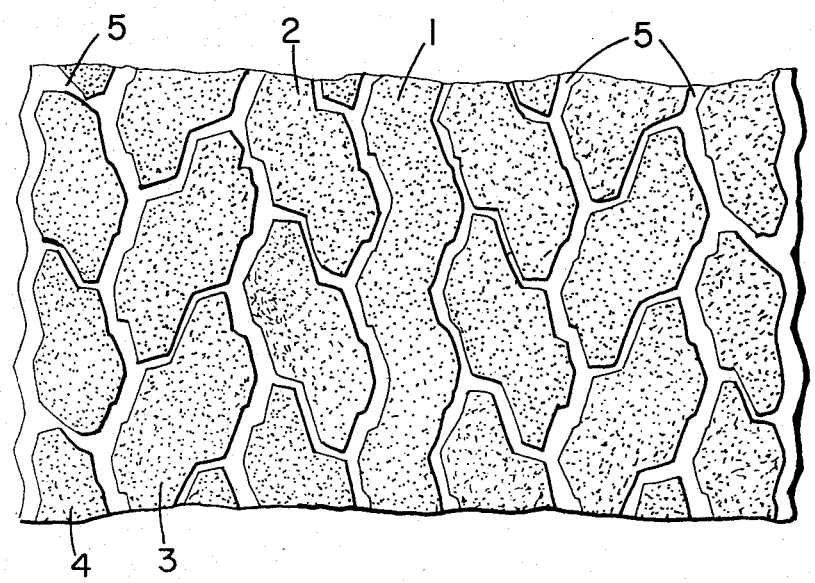

United States Patent [19]
Gorter

[11] 3,856,067
[45] Dec. 24, 1974

[54] PNEUMATIC TIRE
[75] Inventor: Werner Gorter, Baden, Austria
[73] Assignee: Semperit Osterreichisch-Amerikanische Gummiwerke AG, Vienna, Austria
[22] Filed: Mar. 26, 1973
[21] Appl. No.: 344,641

Related U.S. Application Data
[62] Division of Ser. No. 30,826, April 22, 1970.

[30] Foreign Application Priority Data
Nov. 25, 1969 Germany.............................. 1959194

[52] U.S. Cl............................................ 152/209 R
[51] Int. Cl............................................. B60c 11/00
[58] Field of Search ................................... 152/209

[56] References Cited
UNITED STATES PATENTS
| | | | |
|---|---|---|---|
| 1,896,574 | 2/1933 | Covey | 152/209 R |
| 2,504,090 | 4/1950 | Sanderson | 152/209 R |
| 2,670,777 | 3/1954 | Wallace | 152/209 R |

Primary Examiner—James B. Marbert
Attorney, Agent, or Firm—Hopgood, Calimafde, Kalil, Blaustein & Lieberman

[57] ABSTRACT

A pneumatic tire and method of fabricating same in which the tread surface is at least partially roughened during the fabrication of the tire.

3 Claims, 2 Drawing Figures

PNEUMATIC TIRE

This is a division of application Ser. No. 30,826 filed Apr. 22, 1970.

The present invention relates generally to pneumatic tires, and more specifically to a pneumatic tire having an improved tread surface, and to a method for fabricating same.

In the known pneumatic tires the tread surface, that is, the running surface as distinct from the tread profile, has a very hard and smooth outer skin. As a result of the various coatings, such as solutions containing silicone, used during the vulcanizing process, the outer skin of the tire is generally slick and greasy. Accordingly, new tires have a lower frictional resistance than tires which have already been run in. In use and in the course of time the smooth outer skin of the tire is removed by contact with the road surface so that the surface of the tread becomes roughened and has an increased frictional resistance.

In this manner, approximately 0.2 to 0.5 mm of the tread surface of ordinary passenger vehicle tires is removed after about 1,000 km of road travel. The tread surface must be ground down by this amount in order to provide the necessary roughened texture. This means that a vehicle tire must be run in for approximately 1,000 km before it has attained the required frictional coefficient and can be fully utilized with the required control and safety.

The replacement of individual tires with new tires also poses a problem since the new tires will have different values of friction or frictional coefficients than those tires that have already been roughened by use. This in turn increases the danger of skidding since tires which are already worn provide a better braking effect so that the vehicle will tend to pull to one side.

It is an object of the invention to provide a pneumatic tire in which the disadvantages described hereinabove are eliminated.

It is a further object of the invention to provide a pneumatic tire and a method of fabricating same in which the tread is sufficiently roughened at the time the tire is fabricated to ensure sufficient frictional engagement with the road surface.

According to the invention the running surface or tread surface of a pneumatic tire is at least partially fabricated with a rough texture. A tire having such a roughened texture has the required adhesion at the beginning of its use and need not be run in. It is preferable that the average texture depth amounts to at least 0.01 mm since the desired effect will then be reliably obtained.

A running surface of the kind heretofore described may be roughened directly after the completion of the vulcanising operation, such as by grinding or sanding. The tire may also be provided with the rough texture during the vulcanizing operation itself. To this end a vulcanizing mold whose appropriate surfaces are roughened may be employed. However, the texture depth should not be too great otherwise the wear on the running surface will be excessive.

The pneumatic tire formed in accord with the present invention is thus characterised by a favorable frictional resistance immediately after installation or when it is placed in operation.

Figure 2:
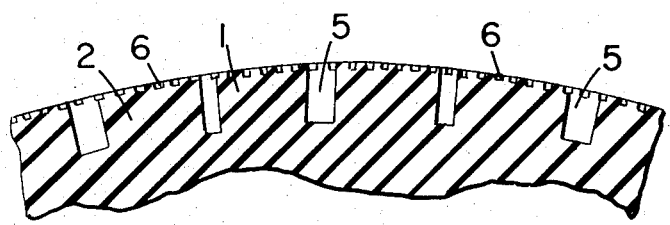

To the accomplishment of the above, and to such further objects as may hereinafter appear, the present invention relates to a pneumatic tire and a method for manufacturing same, substantially as defined in the appended claims and as described in the following specification taken together with the accompanying drawing in which:

FIG. 1 is a partial plan view of the running surface of a pneumatic tire according to the invention; and FIG. 2 is a partial sectional view taken through the pneumatic tire of FIG. 1.

The present invention provides for the roughening of at least a part of the tread surface of a pneumatic tire during its manufacture, with a resulting increase in safety when the tire is initially utilized on a vehicle.

The tread of a tire manufactured in this manner is illustrated in FIGS. 1 and 2, in which the tire comprises a central circumferential rib 1 and blocks 2, 3 and 4 which are defined and separated from one another by a plurality of grooves 5 formed in a known manner in the tire.

In accord with this invention at least a portion of the tread surface of blocks 2–4 as well as rib 1 are roughened at the time the tire is manufactured. In this manner the tire from its time of initial use provides increased frictional engagement with the road surface, thereby significantly improving the control and safety of the vehicle. In the sectional view of FIG. 2, the roughening of the tread surface is obtaining by the formation of a multiplicity of indentations 6 in block 2 and rib 1. Indentations 6, which are preferably formed during the vulcanization process, may be advantageously between 0.001 mm and 1 mm in depth, and are particularly effective to achieve the desired results when they are formed approximately 0.1 mm in depth. It has been found that a depth of less than 0.001 mm for these indentations does not produce the desired frictional effect, and depths of greater than 1 mm tend to create excessive wear on the tire surface.

The roughening of the surface may be performed either during the vulcanization process or directly subsequent to the completion of the vulcanization process. The surface roughening operation may be performed upon completion of the vulcanization operation by means such as grinding or sanding of the smooth tread surface.

The tread surface of the tire may be formed as noted above directly during the vulcanization process, by the use of a vulcanizing mold having a suitable roughened mold surface. Such a mold may be constructed by covering the appropriate surfaces of a mold made of plaster, or any other suitable mold material and shaped in conformance with the vulcanizing mold with a rough material. In this manner, a plaster model corresponding to the shape of the tire is produced, from which the roughened vulcanizing mold can thereafter be constructed in a known manner.

Textile material, such as a woven fabric, a non-woven fabric, or a knitted fabric may be employed to advantage as the rough material used to fabricate the mold. Alternatively, a plastic sheet, suitably configured in conformance to the desired rough profile may be employed in the fabrication of the mold.

While several preferred methods for producing the roughened texture in the tire tread surface have been herein specifically described, it will be apparent that variations and modifications therein may be made without departing from the spirit and scope of the invention.

I claim:

1. A pneumatic tire includes an outer tread surface which in use contacts the surface of the ground, said tread surface is covered by a vulcanization skin and has a plurality of spaced grooves each of which extends into said tread surface to a depth in the order of centimeters, said grooves defining a plurality of areas of the outer tread surface in which said vulcanization skin is substantially continuous and unbroken, said unbroken vulcanization skin in each of said areas including a substantially regular pattern of arcuate indentations having depths ranging between 0.1 and 1 mm measured from said outer tread surface, and said pattern of said indentations corresponding to the surface pattern of a textile material.

2. A pneumatic tire as claimed in claim 1, in which said textile material is a woven fabric.

3. A pneumatic tire as claimed in claim 1 in which said textile material is a knitted fabric.

* * * * *